(12) United States Patent
Kwant et al.

(10) Patent No.: US 10,515,293 B2
(45) Date of Patent: Dec. 24, 2019

(54) METHOD, APPARATUS, AND SYSTEM FOR PROVIDING SKIP AREAS FOR MACHINE LEARNING

(71) Applicant: HERE GLOBAL B.V., Eindhoven (NL)

(72) Inventors: Richard Kwant, Oakland, CA (US);
Anish Mittal, Berkeley, CA (US);
David Lawlor, Chicago, IL (US);
Zhanwei Chen, Oakland, CA (US);
Himaanshu Gupta, San Francisco, CA (US)

(73) Assignee: HERE Global B.V., Eindhoven (NL)

( * ) Notice: Subject to any disclaimer, the term of this patent is extended or adjusted under 35 U.S.C. 154(b) by 47 days.

(21) Appl. No.: 15/842,444

(22) Filed: Dec. 14, 2017

(65) Prior Publication Data

US 2019/0188538 A1 Jun. 20, 2019

(51) Int. Cl.
*G06K 9/62* (2006.01)
*G06N 20/00* (2019.01)

(52) U.S. Cl.
CPC ........... *G06K 9/6265* (2013.01); *G06N 20/00* (2019.01)

(58) Field of Classification Search
CPC .......... G06T 7/11; A61B 5/055; A61B 5/103; A61B 5/4514; A61B 5/4528
USPC ........................................................ 382/159
See application file for complete search history.

(56) References Cited

U.S. PATENT DOCUMENTS

| 7,593,903 B2 | 9/2009 | Forman et al. |
| 8,755,595 B1 | 6/2014 | Bissacco et al. |
| 2017/0200063 A1* | 7/2017 | Nariyambut Murali ..................... G06K 9/4628 |

OTHER PUBLICATIONS

Vatne, "Using Deep Convolutional Networks to Detect Roads in Aerial Images", NTNU Norwegian University of Science and Technology, May 2016, 120 Pages.
Taiana et al., "An Improved Labelling for the INRIA Person Data Set for Pedestrian Detection", Pattern Recognition and Image Analysis, Lecture Notes in Computer Science, vol. 7887, 2013, 10 Pages.
Verbeek et al., "Scene Segmentation with Conditional Random Fields Learned From Partially Labeled Images", Proceedings of the 20th International Conference on Neural Information Processing Systems, 2007, pp. 1-8.

* cited by examiner

*Primary Examiner* — Charlotte M Baker
(74) *Attorney, Agent, or Firm* — Ditthavong & Steiner, P.C

(57) ABSTRACT

An approach is provided for using one or more skip areas to label, train, and/or evaluate a machine learning model. The approach, for example, involves specifying the one or more skip areas with respect to an image. By way of example, a non-skip area of the image is a portion of the image that is not in the one or more skip areas. The approach also involves initiating a labeling of one or more features in the non-skip area of the image while excluding the one or more skip areas from the labeling to create a partially labeled image. The partially labeled image is then included in a training dataset for training a machine learning model.

20 Claims, 20 Drawing Sheets

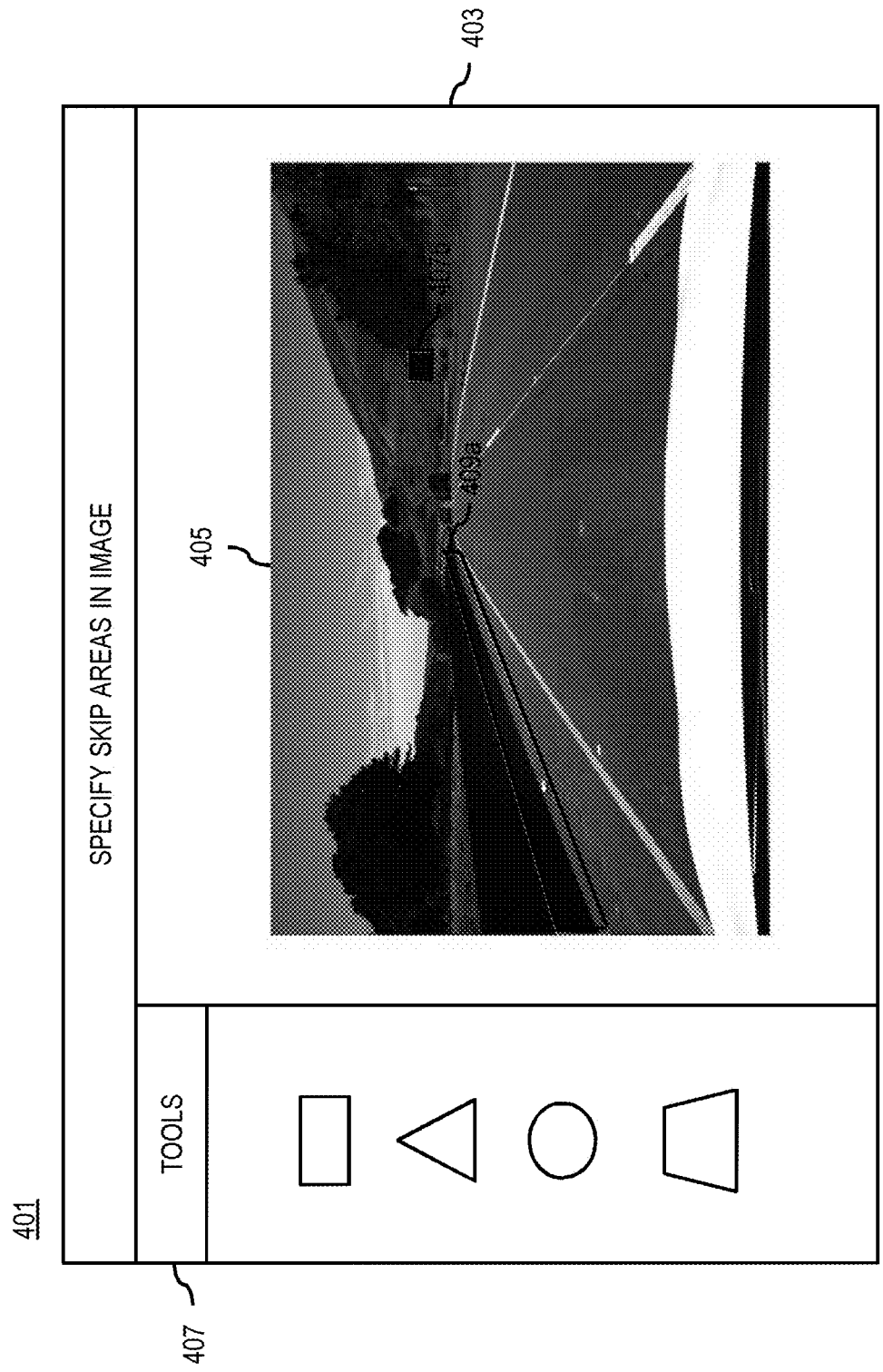

METHOD, APPARATUS, AND SYSTEM FOR PROVIDING SKIP AREAS FOR MACHINE LEARNING

BACKGROUND

Over the past decades, massive increases in the scale and types of annotated or labeled data have accelerated advances in all areas of machine learning. This has enabled major advances is many areas of science and technology, as complex models of physical phenomena or user behavior, with millions or perhaps billions of parameters, can be fit to datasets of increasing size. For example, in computer vision, machine learning models traditionally rely on training datasets comprising a large number of feature-labeled images. However, manually labeling these training images requires considerable human resources, particularly when there are areas of the images that may be difficult for humans to label (e.g., poor quality areas, obscured areas, etc.). Accordingly, service providers face significant technical challenges to enable efficient labeling of images given limited human resources.

SOME EXAMPLE EMBODIMENTS

Therefore, there is a need for an approach for providing skip areas in images for machine learning labeling, training, and/or evaluation.

According to one embodiment, a computer-implemented method for using one or more skip areas to label, train, and/or evaluate a machine learning model comprises specifying the one or more skip areas with respect to an image. A non-skip area of the image is a portion of the image that is not in the one or more skip areas. The method also comprises initiating a labeling of one or more features in the non-skip area of the image while excluding the one or more skip areas from the labeling to create a partially labeled image. The partially labeled image is then included in a training dataset for training a machine learning model.

According to another embodiment, an apparatus for using one or more skip areas to label, train, and/or evaluate a machine learning model comprises at least one processor, and at least one memory including computer program code for one or more computer programs, the at least one memory and the computer program code configured to, with the at least one processor, cause, at least in part, the apparatus to specify the one or more skip areas with respect to an image. A non-skip area of the image is a portion of the image that is not in the one or more skip areas. The apparatus is also caused to initiate a labeling of one or more features in the non-skip area of the image while excluding the one or more skip areas from the labeling to create a partially labeled image. The partially labeled image is then included in a training dataset for training a machine learning model.

According to another embodiment, a non-transitory computer-readable storage medium for using one or more skip areas to label, train, and/or evaluate a machine learning model carries one or more sequences of one or more instructions which, when executed by one or more processors, cause, at least in part, an apparatus to specify the one or more skip areas with respect to an image. A non-skip area of the image is a portion of the image that is not in the one or more skip areas. The apparatus is also caused to initiate a labeling of one or more features in the non-skip area of the image while excluding the one or more skip areas from the labeling to create a partially labeled image. The partially labeled image is then included in a training dataset for training a machine learning model.

According to another embodiment, an apparatus for using one or more skip areas to label, train, and/or evaluate a machine learning model comprises means for specifying the one or more skip areas with respect to an image. A non-skip area of the image is a portion of the image that is not in the one or more skip areas. The apparatus also comprises means for initiating a labeling of one or more features in the non-skip area of the image while excluding the one or more skip areas from the labeling to create a partially labeled image. The partially labeled image is then included in a training dataset for training a machine learning model.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A and 4B are diagrams illustrating example user interfaces for specifying skip areas in images, according to one embodiment;

DESCRIPTION OF SOME EMBODIMENTS

Examples of a method, apparatus, and computer program for providing skip areas for machine learning are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
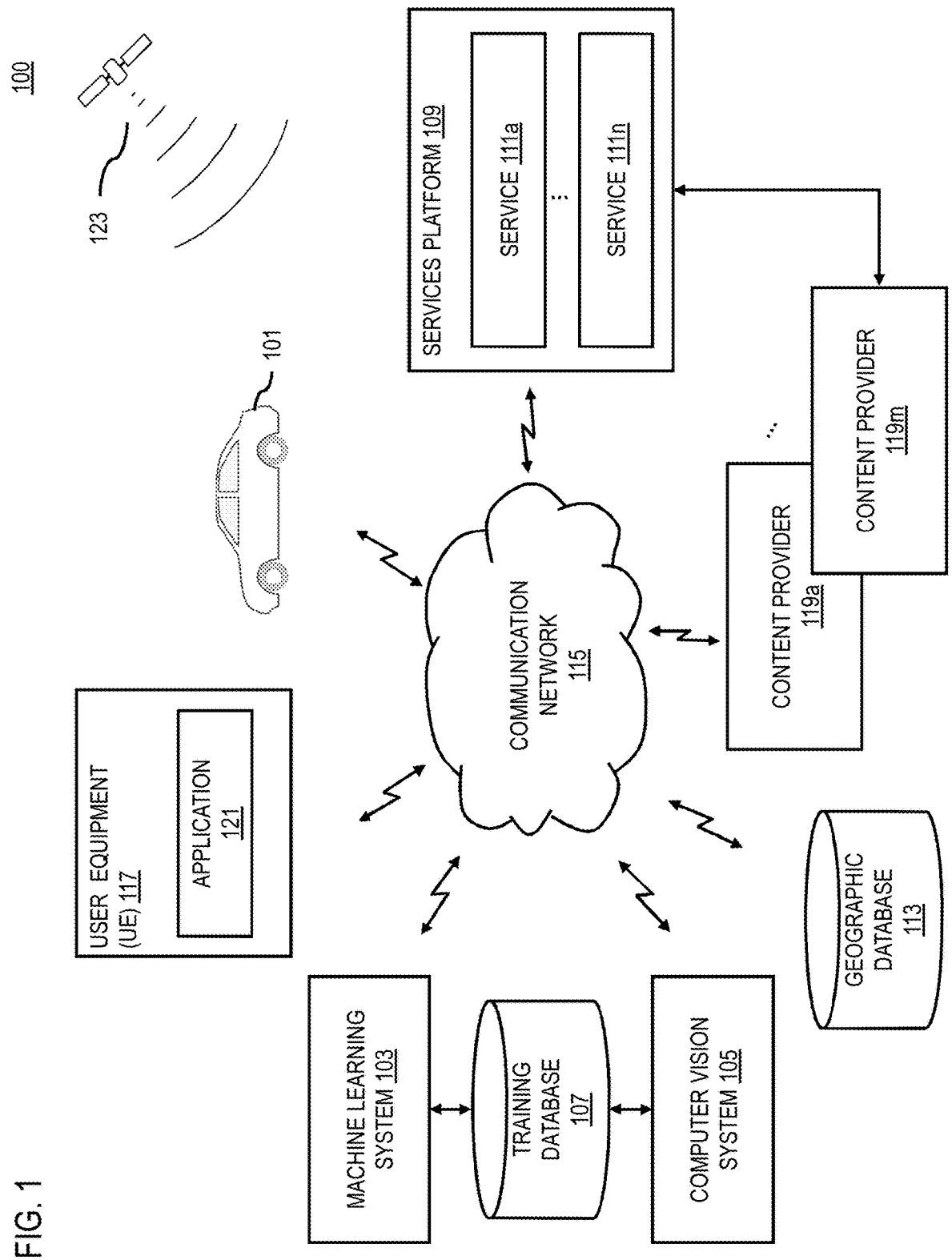
FIG. 1 is a diagram of a system capable of providing skip areas for machine learning, according to one embodiment.

FIG. 1 is a diagram of a system capable of providing skip areas for machine learning, according to one embodiment. As noted above, machine learning-based computer vision systems have enabled a variety of object recognition based services and applications. For example, autonomous driving has quickly become an area of intense interest, with recent advances in machine learning, computer vision and computing power enabling real-time mapping and sensing of a vehicle's environment. Such an understanding of the environment enables autonomous, semi-autonomous, or highly assisted driving in a vehicle (e.g., a vehicle 101) in at least two distinct ways.

First, real-time sensing of the environment provides information about potential obstacles, the behavior of others on the road, and safe, drivable areas. An understanding of where other cars are and what they might do is critical for a vehicle 101 to safely plan a route. Moreover, vehicles 101 generally must avoid both static (lamp posts, e.g.) and dynamic (cats, deer, e.g.) obstacles, and these obstacles may change or appear in real-time. More fundamentally, vehicles 101 can use a semantic understanding of what areas around them are navigable and safe for driving. Even in a situation where the world is completely mapped in high resolution, exceptions will occur in which a vehicle 101 might need to drive off the road to avoid a collision, or where a road's geometry or other map attributes like direction of travel have changed. In this case, detailed mapping may be unavailable, and the vehicle 101 has to navigate using real-time sensing of road features or obstacles using a computer vision system (e.g., a machine learning system 103 in combination with a computer vision system 105).

A second application of vision techniques in autonomous driving is localization of the vehicle 101 with respect to a map of reference landmarks. Understanding one's location on a map enables planning of a route, both on fine and coarse scales. On a coarse scale, navigation maps allow vehicles 101 to know what roads to use to reach a particular destination. However, on a finer scale, maps allow vehicles 101 to know what lanes to be in and when to make lane changes. Knowing this information is important for planning an efficient and safe route, for in complicated driving situations maneuvers need to be executed in a timely fashion, and sometimes before they are visually obvious. In addition, localization with respect to a map enables the incorporation of other real-time information into route planning. Such information could include traffic, areas with unsafe driving conditions (ice, fog, potholes, e.g.), and temporary road changes like construction.

In one embodiment, the machine learning system 103 in combination with the computer vision system 105 enables autonomous driving (as described above) and other similar object/image recognition based services through a machine learning framework. It is noted that although the various embodiments described herein are discussed herein with respect to the machine learning system 103 and the computer vision system 105 for autonomous driving applications, it is contemplated that the various embodiments are applicable to any type of machine learning application, service, or function that uses labeled images in its training dataset. In other words, at the core of the machine learning framework described in the various embodiments is a training dataset of images with feature labels for training a machine learning model to make feature predictions. Therefore, accuracy of the feature labels has a direct correlation to the accuracy of the trained feature prediction model. Also, labels can serve as ground truth for measuring/evaluating the quality of the feature detection and can be a key indicator to judge the quality of the trained machine learning model.

Generally, creating feature labels in a training dataset entails presenting a human labeler with an image and requesting the that the human labeler manually create the feature labels for the image. This labeling process can be human resource intensive particularly when a large number of images (e.g., thousands, millions, or more) are needed to train a machine learning model to a desired level of accuracy. As a result, labeling time is extremely important to optimize since there are limited human resources.

For example, labeling of road features on the images can be extremely challenging for human labelers in certain situations, thereby leading to increased labeling time. The situations include, but are not limited to:

Poor visibility areas in the images including areas of under/over image exposure, foggy conditions, faded features, occlusions, and/or the like;

Presence of features like poles which repeat with a high enough frequency in certain kinds of images such as images depicting bridges or railings (e.g., it can be overwhelming for a human labeler to label a large number of repetitive features);

Features that are too far away in the distance, which can be difficult a human labeler to identify and label; and Based on the provided feature definition, a human labeler or annotator may not be sure whether a given feature in the image should be labeled or not (e.g., although the labeling instructions can be well defined, but there are always some rare scenarios and edge cases that are not accounted for or otherwise open to interpretation by the labeler.

These situations can be problematic because not labeling the features under these circumstances though would tell the learning machine that there is no feature there, thereby leading to poor training or performance by the resulting trained machine learning model. Conversely, trying to label the features would take a lot of labeler time and can result in poor quality labels in many situations.

To address these problems, the system 100 of FIG. 1 introduces a capability to specify or define "skip areas" on an image-by-image basis to define which areas of the respective image are not to be labeled or otherwise processed in the machine learning framework (e.g., the train and/or evaluate a machine learning model). In one embodiment, the skip areas can be areas of the image that are challenging or difficult to label as described above. The system 100, for instance, defines the skip areas consistently for each image across the entire machine learning pipeline from labeling of the training images to the training and evaluation of the resulting machine learning model. In other words, compared to traditional approaches, specifying skip areas in training images can provide more accurate training data since the machine learning system 103 of the system 100 can be programmed to not compute the loss function on the skip areas of model training. Skip areas would also provide more accurate evaluation of the trained machine learning model. For example, by considering the skip areas in training images during evaluation of the trained machine learning model, the system 100 would not flag any predicted features that fall within the skip areas of the corresponding images as false positives. Therefore, these potential false positives would not result in a negative evaluation of the trained machine learning model because the system 100 would know that features falling inside the skip areas were not annotated or were annotated with less than an acceptable level of accuracy during the labeling phase of creating the training dataset.

In this way, the system 100 advantageously reduces the computing and/or other human costs associated with manually annotating training datasets and then training a machine learning model with the data. For example, identifying and skipping difficult areas makes the labeling per image faster, thereby making room for additional images to be labeled for the same number of available man hours hence. This increased number of labeled images can further lead to making the training dataset bigger and more diverse, and creating a more robust machine learning model. In other words, the advantages of using skip areas in the machine learning framework provides advantages such as, but no limited to:

More labeled images in the training dataset for the same amount of labeling time since the amount of time spent to label each image would be reduced;

Better training of the machine learning model since the loss function would only be computed on the portions of the training images that has not skipped (e.g., non-skip areas); and More accurate evaluation since the trained machine learning module would not be penalized predicted features that do not match ground truth labels in the skip areas of the training image.

Therefore, providing skip areas in images for machine learning can lead to more optimized resource usage as well as improved model performance. For example, given the scale and speed with which observations can be generated with advanced sensors and user behavior logs, machine learning model development and training data annotation efforts have become precious resources to be optimized. In an example use case, the system 100 may have at its disposal several hundreds of thousands, millions, etc. of street-level vehicle capture images (e.g., captured by a vehicle 101), which the system 100 would like to have annotated with a set of pre-defined features (including lane markings, road signs, and/or poles, among others) and/or otherwise included in a model training dataset (e.g., a training database 107). However, many of these images or observations may have areas that are difficult or challenging for a human annotator to label as previously discussed. Expending labeling or training effort on the difficult portions of these images can an inefficient use of the available computer and/or human resources dedicated to developing machine learning models.

Figure 2:
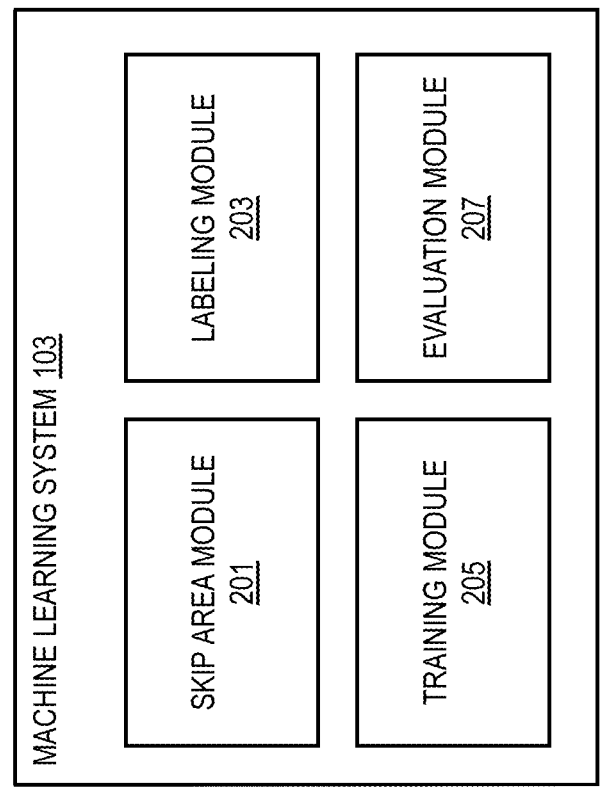
FIG. 2 is a diagram of components of a machine learning system, according to one embodiment.

FIG. 2 is a diagram of components of a machine learning system, according to one embodiment. By way of example, the machine learning system 103 includes one or more components for providing skip areas for machine learning according to the various embodiments described herein. It is contemplated that the functions of these components may be combined or performed by other components of equivalent functionality. In this embodiment, the machine learning system 103 includes a skip area module 201, a labeling module 203, a training module 205, and an evaluation module 207. The above presented modules and components of the machine learning system 103 can be implemented in hardware, firmware, software, or a combination thereof. Though depicted as a separate entity in FIG. 1, it is contemplated that the machine learning system 103 may be implemented as a module of any of the components of the system 100 (e.g., a component of computer vision system 105, services platform 109, services 111*a*-111*n* (also collectively referred to as services 111), etc.). In another embodiment, one or more of the modules 201-207 may be implemented as a cloud based service, local service, native application, or combination thereof. The functions of the machine learning system 103 and the modules 201-207 are discussed with respect to FIGS. 3-6 below.

As discussed above, one application of machine-learning-based vision techniques using skip areas is vehicle localization with respect to known reference features (e.g., localization of the vehicle 101 to specific lanes of a road segment). Traditionally, most vehicle navigation systems have accomplished this localization using GPS, which generally provides a real-time location with a 95% confidence interval of 7.8 meters. However, in complicated urban environments, reflection of GPS signals can further increase this error, such that one's location may be off by as much as 30 meters. Given that the width of many lanes is 3-4 meters, this accuracy is not sufficient to properly localize a vehicle 101 (e.g., an autonomous vehicle) so that it can make safe route planning decisions. Other sensors, such as inertial measurement units (IMUS) can increase the accuracy of localization by taking into account vehicle movement, but these sensors tend to drift and still do not provide sufficient accuracy for localization.

In general, a localization accuracy of around 10 cm is needed for safe driving in many areas. One way to achieve this level of accuracy is to use visual odometry, in which features are detected from imagery using feature prediction models (i.e., a machine learning classifier). These features can then be matched to a database of features to determine one's location. By way of example, traditional feature-based localization that both detect features and localize against them generally rely on low-level features. However, low-level features typically used in these algorithms (e.g., Scale-Invariant Feature Transform (SIFT) or Oriented FAST and rotated BRIEF (ORB)) tend to be brittle and not persist in different environmental and lighting conditions. As a result, they often cannot be used to localize a vehicle on different days in different weather conditions. Aside from reproducibility, the ability to detect and store higher level features of different types (e.g., lane features such as lane markings, lane lines, etc.) can provide better and more accurate localization.

In response to these issues, the system 100 of FIG. 1 (e.g., including the machine learning system 103 and/or computer vision system 105) focuses on detecting high level features that have semantic meaning for human beings. One such feature that is important to autonomous driving is the detection of lane features (e.g., lane markings, lane lines, Botts' dots, reflectors, etc.) and corresponding lane models. Lane-level information is important for self-driving applications because it defines the grammar of driving. Without knowledge of lane markings, it can difficult or impossible to determine where a vehicle 101 should drive, can drive, and what maneuvers are possible. As a result, the ability to detect lane-lines in real-time constitutes a fundamental part for the design of an autonomous vehicle 101.

In other words, the success of localization based on features detected from an image can depend on the precise localization of those features within the image and the quality of the technique used to detect the lane features or other similar features. This success, for instance, can depend greatly on how well trained a feature prediction model is. To create a well-trained machine learning or prediction model, the system 100 can use the embodiments described herein to improve the efficiency of the machine learning system 103 with respect to machine learning labeling, training, and/or evaluation as described with respect to FIG. 3.

Figure 3:
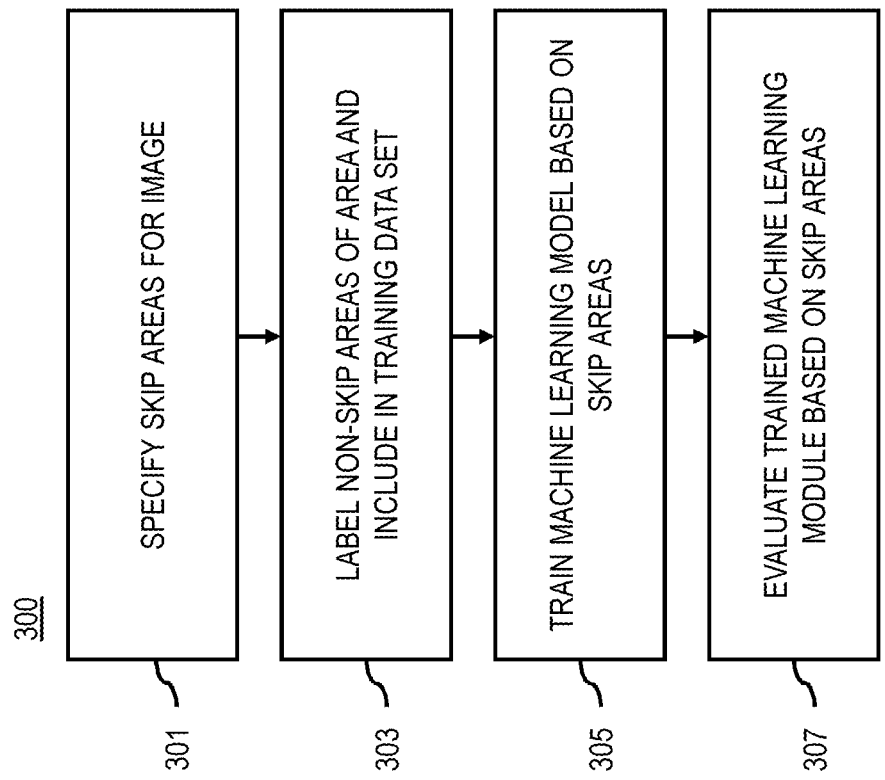
FIG. 3 is a flowchart of a process for providing skip areas for machine learning, according to one embodiment.
Figure 9:
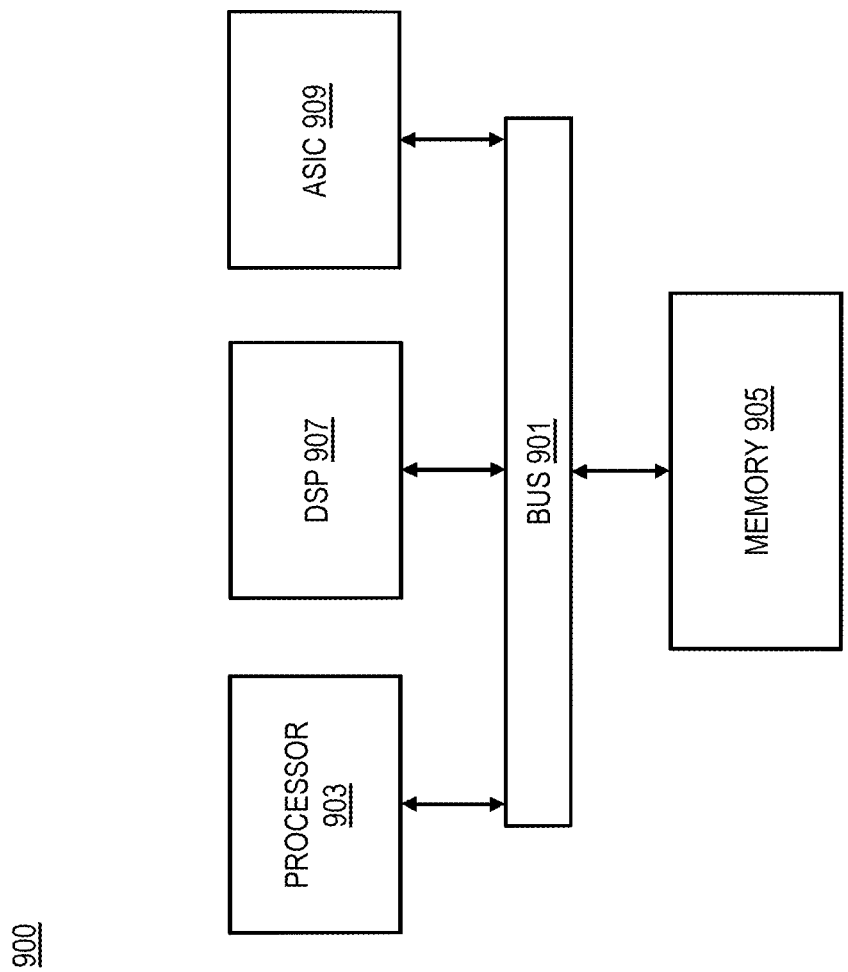
FIG. 9 is a diagram of a chip set that can be used to implement an embodiment of the invention.

FIG. 3 is a flowchart of a process for providing skip areas for machine learning, according to one embodiment. In various embodiments, the machine learning system 103 and/or any of the modules 201-207 of the machine learning system 103 may perform one or more portions of the process 300 and may be implemented in, for instance, a chip set including a processor and a memory as shown in FIG. 9. As such, the machine learning system 103 and/or the modules 201-207 can provide means for accomplishing various parts of the process 300, as well as means for accomplishing embodiments of other processes described herein in conjunction with other components of the system 100. Although the process 300 is illustrated and described as a sequence of steps, its contemplated that various embodiments of the process 300 may be performed in any order or combination and need not include all of the illustrated steps.

In one embodiment, the machine learning system 103 includes or is otherwise associated with a machine learning model to can be used to label images with one or more features (e.g., road markings, signs, and/or other objects that are visible in an image and can be used for visual odometry). Generally, a machine learning model (e.g., a set of equations, rules, decision trees, etc.) manipulates an input feature set to make a prediction about the feature set or the phenomenon/observation that the feature set represents. The machine learning system 103 can use any means known in the art to detect features in input observations. As used herein, an observation can include any image or set of images representing an observed phenomenon from which features can be extracted, and the features can include any property or characteristic of the observed phenomenon.

It is contemplated that the machine learning model and/or the machine learning system 103 can be used to support any service or function. For example, with respect to using the machine learning system 103 for visual odometry (e.g., to support vehicle localization) for autonomous driving or other image-based applications, one technique that has shown significant ability to detect lanes or other objects is the use of convolutional neural networks, recurrent neural networks, and/or other equivalent machine learning classifiers to process images. Neural networks have shown unprecedented ability to recognize objects in images, understand the semantic meaning of images, and segment images according to these semantic categories to predict related features. When such neural networks or other machine learning classifiers predict whether an image depicts or is otherwise associated with certain classification features, they can also compute a confidence or probability that the predicted feature is likely to be true. In an embodiment where the features or road or map related feature, the machine learning system 103 can use the trained machine learning model to generate navigation guidance information.

In one embodiment, as discussed above, the machine learning model uses training or ground truth data to automatically "learn" or detect relationships between different input feature sets and then output a predicted feature. The quality of the feature prediction model and the feature predictions that it makes can be highly dependent on the quality of the training dataset used to train the model. Training data is generally created by human labelers who manually mark labels for each data item in the training dataset. For example, with respect to a use case of machine learning based object detection in images, the training or ground truth data can include a set of images that have been manually marked or annotated with feature labels to indicate examples of the features or objects of interest. A manually marked feature (e.g., lane markings, road signs, etc.), for instance, can be a polygon or polyline representation of the feature that a human labeler has visually detected in the image. In one embodiment, the polygon, polyline, and/or other feature indicator can outline or indicate the pixels or areas of the image that the labeler designates as depicting the labeled feature. As discussed above, the training dataset can potentially require thousands or even millions of examples (e.g., individual data item or images) marked with each feature of interest to train the feature prediction model to a specified quality, thereby requiring considerable human resources of to perform the labeling.

To more efficiently use the human resources available for labeling training images (e.g., man hours available for manual annotation of the images), the skip area module 201 of the machine learning system 103 specifies one or more skip areas with respect to one or more images that are to be included in a training dataset (step 301). In one embodiment, the skip areas are regions of the image (e.g., areas comprising pixels of the image) that are not to be labeled by the annotator, and/or further processed by the machine learning framework when training and/or evaluating the resulting machine learning model. In one embodiment, the one or more skip areas are delineated in the image using one or more polygons. In one embodiment, a non-skip area of the image is a portion of the image that is not in the one or more skip areas. This non-skip area, for instance, are the areas or pixels of the image that are to be labeled by annotator and used for training and/or evaluation of the machine learning model.

As discussed above, in one embodiment, the one or more skip areas correspond to one or more areas to the image that correspond to pixels affected by one or more image conditions. The images conditions are characteristics of the image or the features that are depicted that can be challenging or difficult for a human annotator to label. In one embodiment, the skip area module 201 can present images that are being prepared for possible inclusion in a machine learning training dataset for manual identification of skip areas by a user. FIG. 4A illustrates an example user interface (UI) 401 that provides for manual identification or specification of skip areas. The UI 401 presents a UI object 403 displaying an image 405. The UI 401 also includes tools 407 for drawing the boundaries of the skip areas in the image 405. In one embodiment, the user can specify any number of skip areas 409a and 409b (also collectively referred to as skip areas 409) in the image 405. Once the skip areas 409 are defined, the boundaries or polygons corresponding to the skip areas 409 and their respective locations in the image 405 can be associated with the image 405 by storing the skip areas 409 as metadata of the image 405. The metadata, for instance, can be stored in the training database 107 along with the image 405, so that the skip area data is available to other processes of the machine learning system 103 (e.g., for training, evaluation, etc. of machine learning models).

Figure 4B:
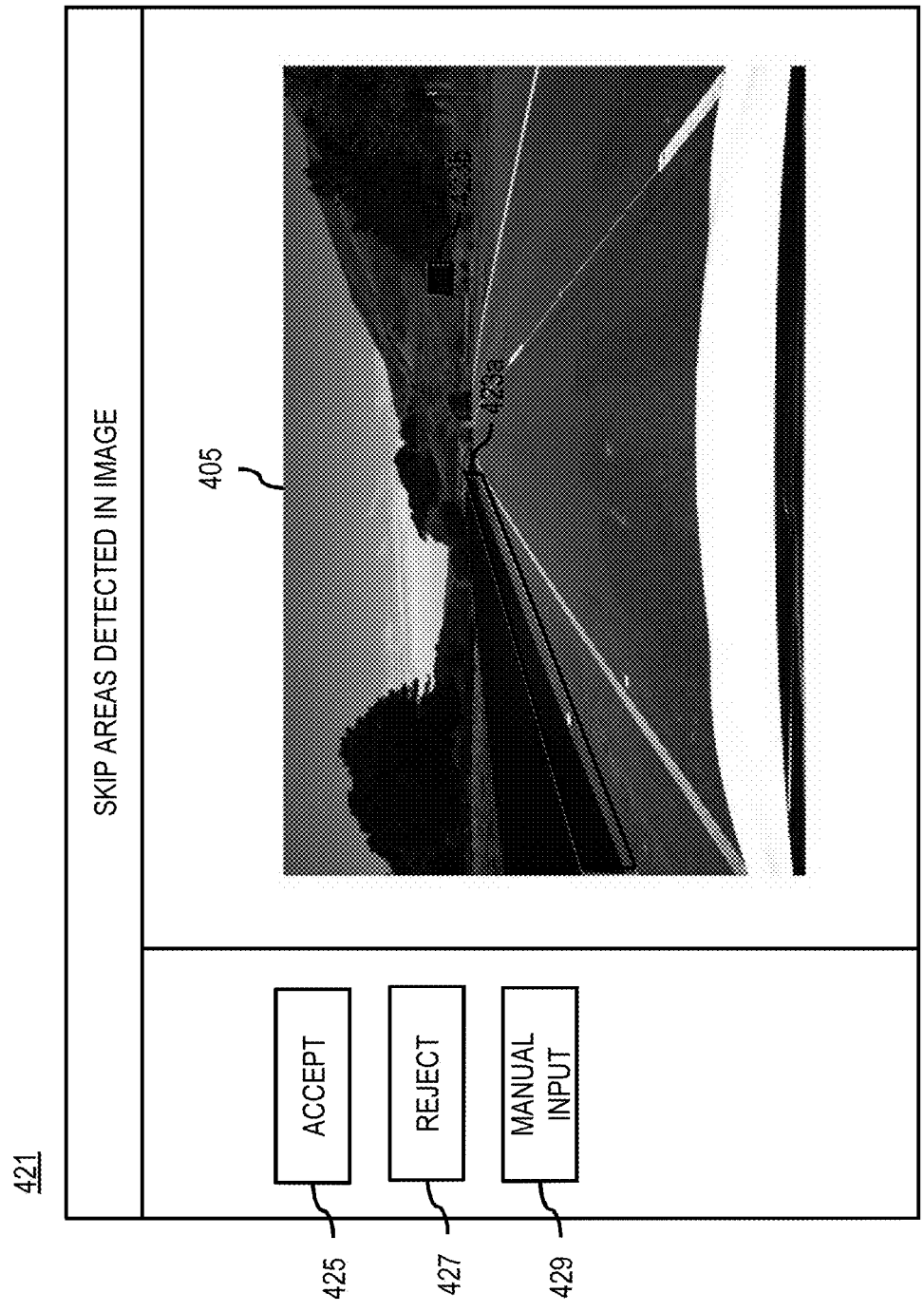

In one embodiment, the skip area module 201 can use another machine learning classifier that has been trained to classify the areas of the training images that correspond to image conditions associated with challenging or difficult feature labeling. In other words, the skip area module 201 can process the image using a trained machine learning classifier or equivalent to determine one or more image conditions that can be used to automatically define skip areas. In one embodiment, as shown in FIG. 4B, the skip area module 201 can then present a UI 421 to display the automatically identified skip areas 423a and 423b (also collectively referred to as skip areas 423) overlaid on the image 403 to the user. In this example, the UI 421 includes an option 425 for the user to accept the automatically identified skip areas 423, an option 427 for the user to reject the skip areas 423, and an option 429 to manually alter the skip areas 423. In yet another example, the skip area module 201 can use the automatically identified skip areas 423 without presenting the UI 421 or otherwise obtaining user input. In this way, the specification of the skip areas 423 can be performed automatically.

Figure 5A:
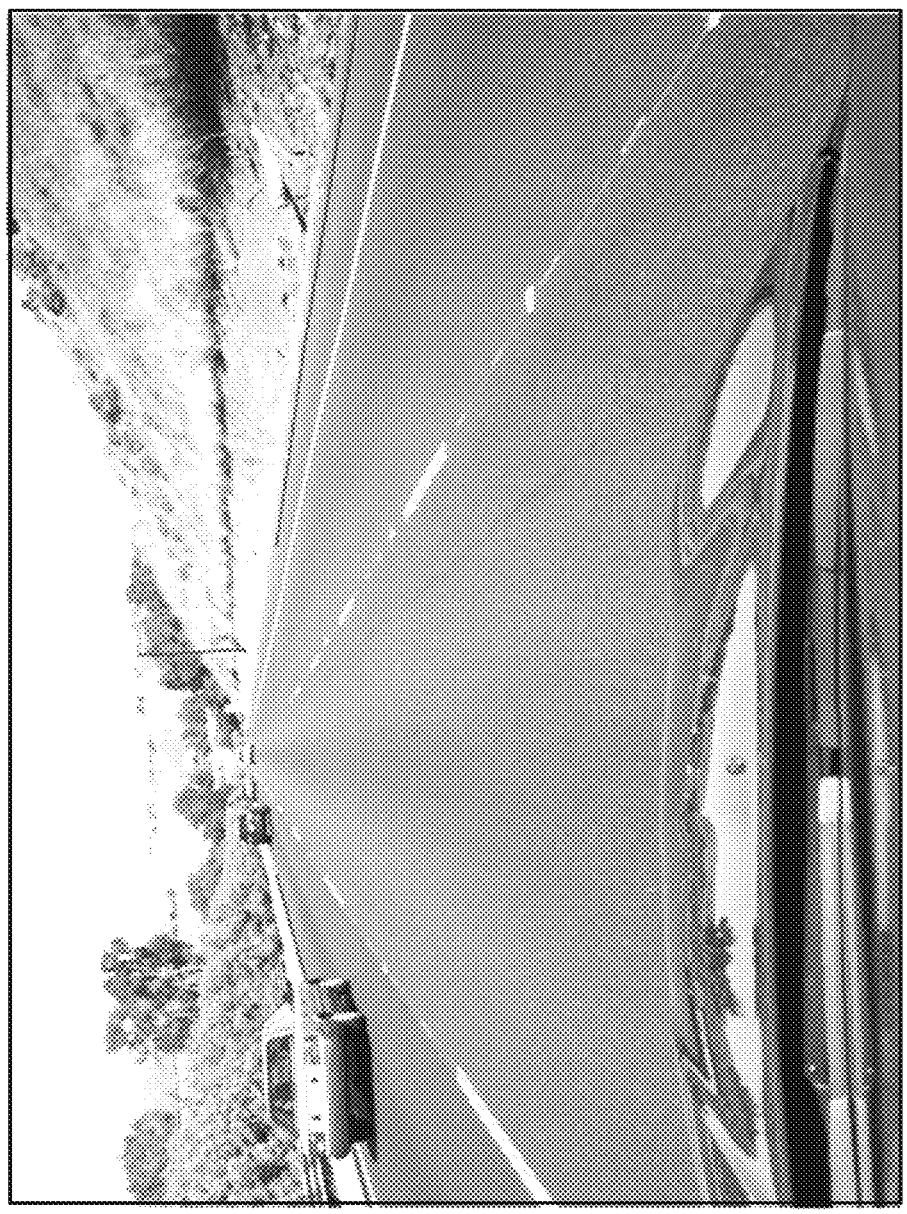
FIGS. 5A-5J are diagrams illustrating example image defect areas for specifying skip areas, according to one embodiment.
Figure 5B:
Figure 5C:
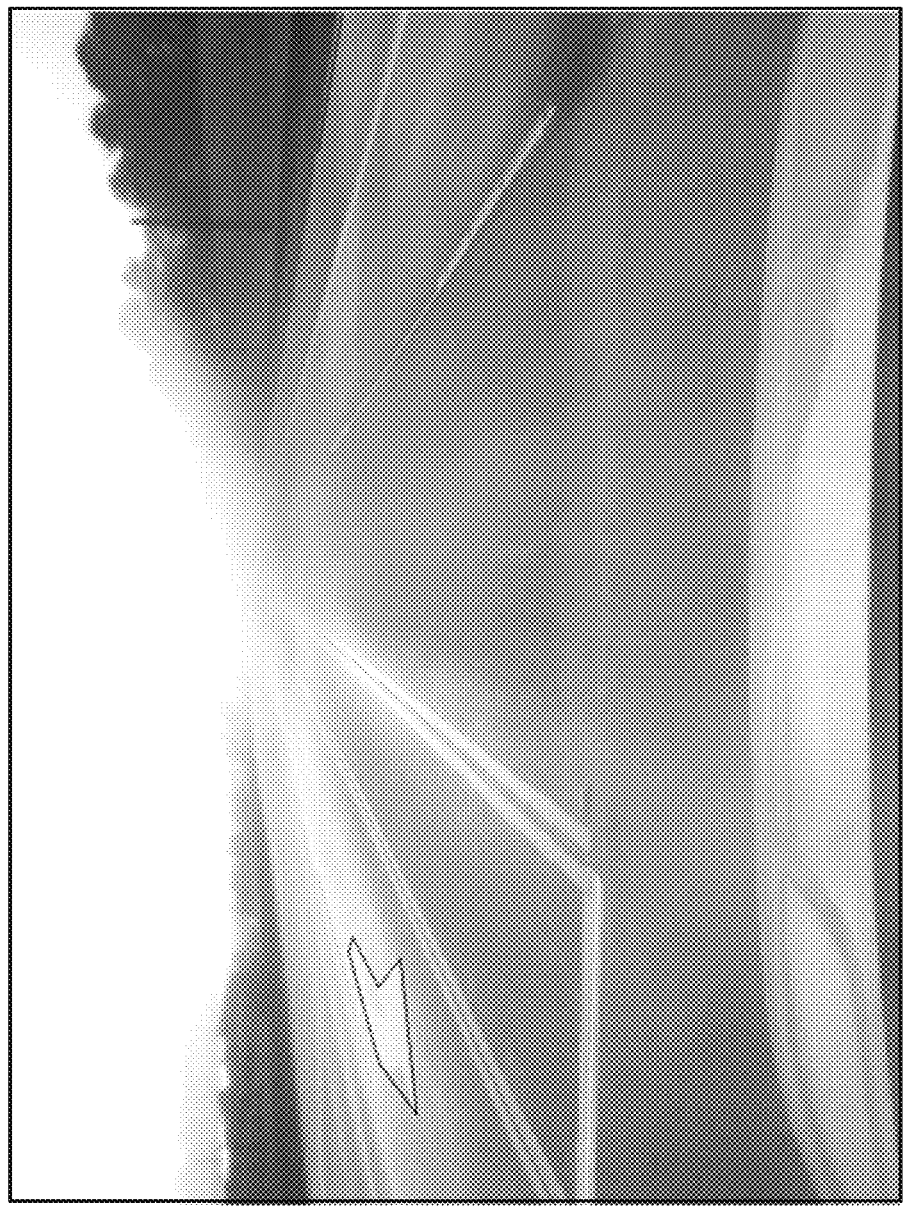

In one embodiment, the one or more image conditions that can trigger identification of a skip area (e.g., either manually or automatically) can include, but is not limited to, over-exposed area, an under-exposed area, a foggy area, a blurred area, a faded feature, a shiny surface, an occluded area, a perspective distortion, a repetitive feature, or a combination thereof. The skip area, for instance, can be defined as the area of the image occupied by the respective image conditions. FIGS. 5A-5I, illustrate examples of the images with image conditions that can be used to identify skip areas. More specifically, the image 501 of FIG. 5A is overexposed in some areas of the mage which can make it difficult for a human annotator or labeler to accurately label features in the overexposed areas without considerable extra effort or time. The image 511 of FIG. 5B is underexposed making those areas dark and blurred, which can also obscure features from a human annotator and are difficult to label accurately. The image 521 of FIG. 5C is an example of a foggy image condition where it can be difficult to observe the lanes and/or other features to accurately create ground truth labels.

Figure 5D:
Figure 5E:
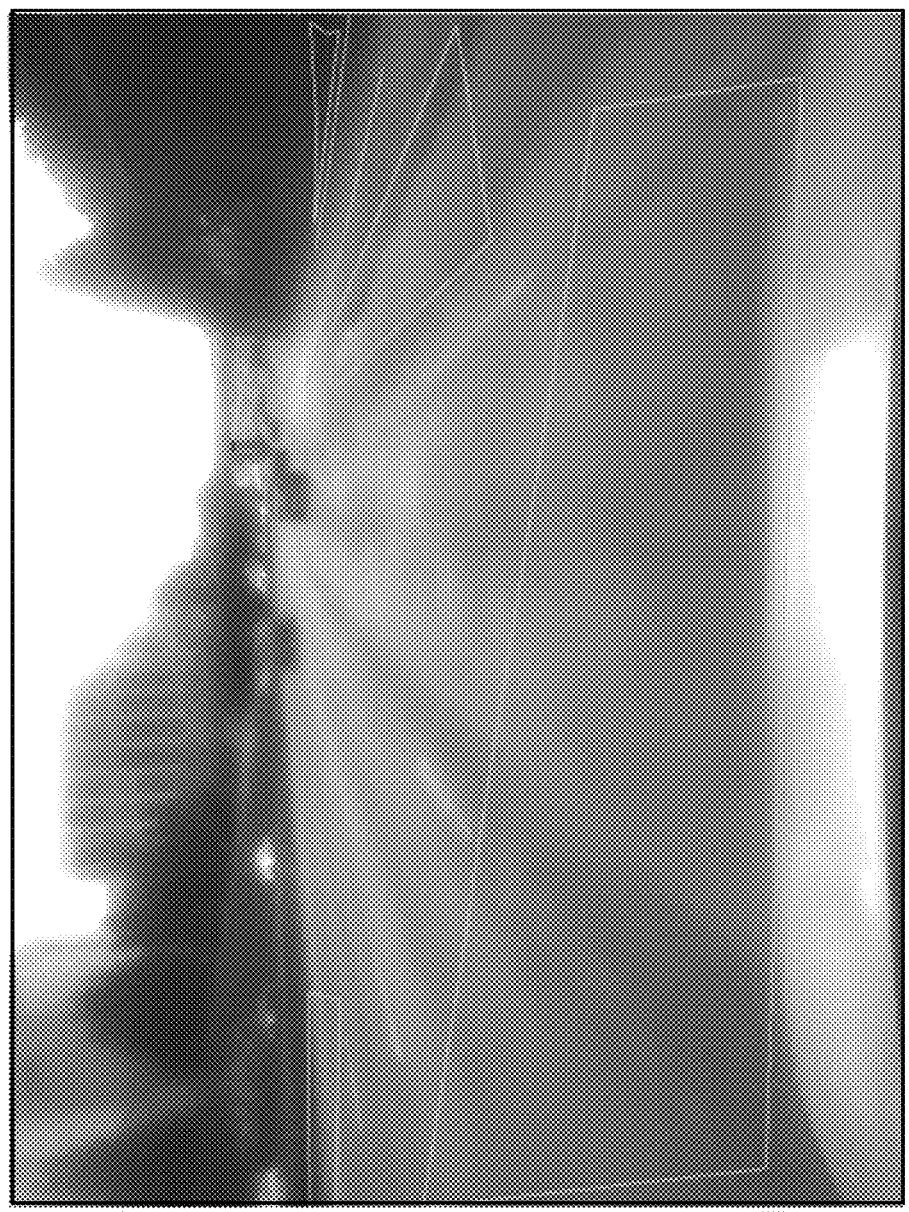
Figure 5F:
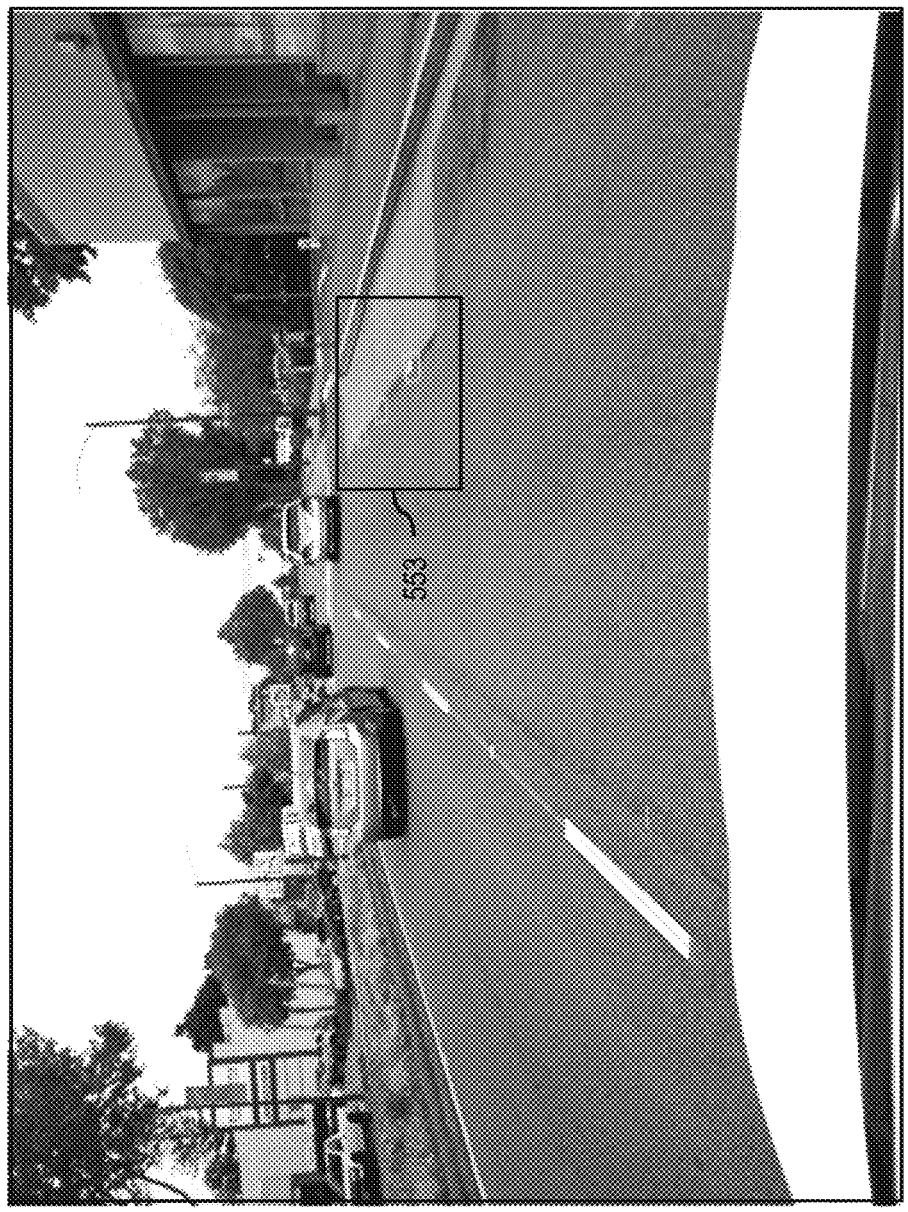
Figure 5G:
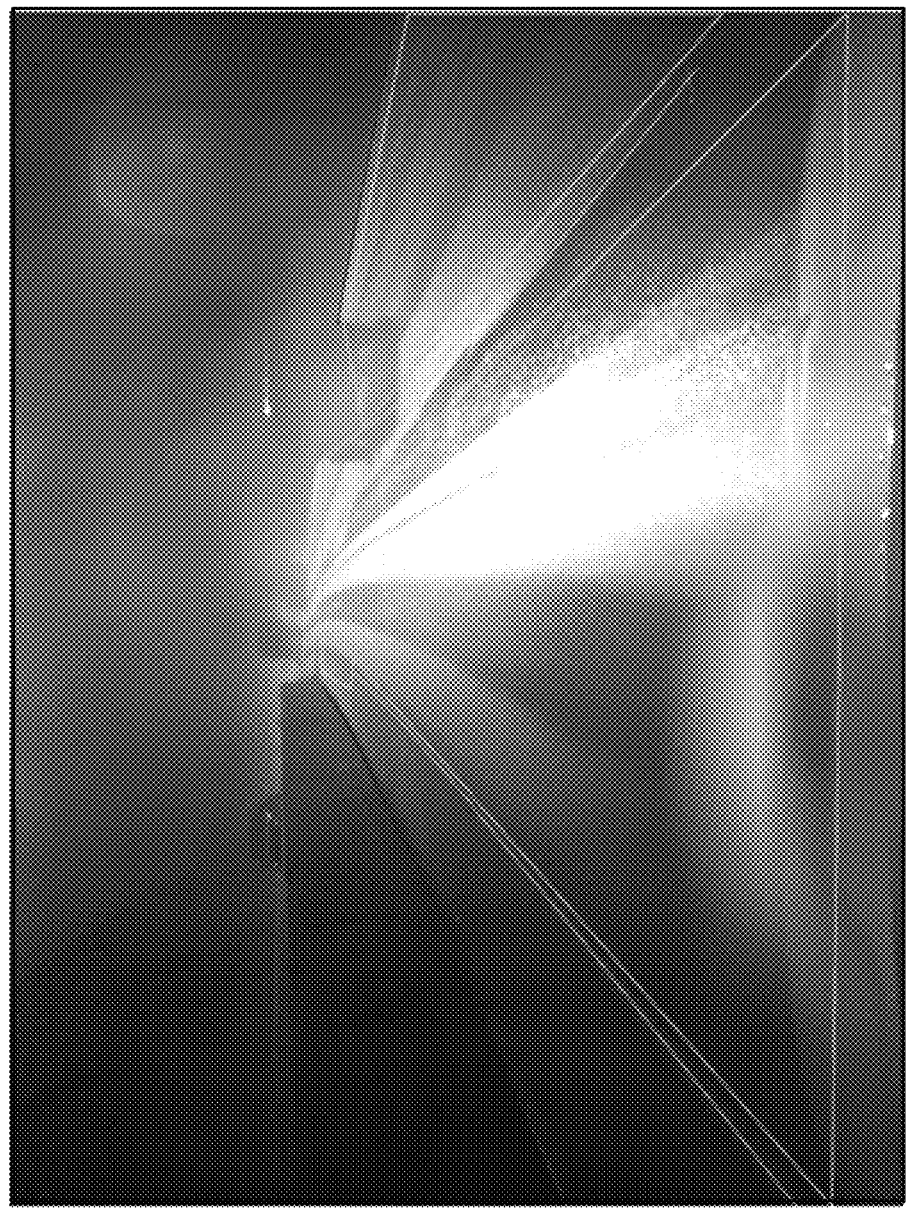
Figure 5H:
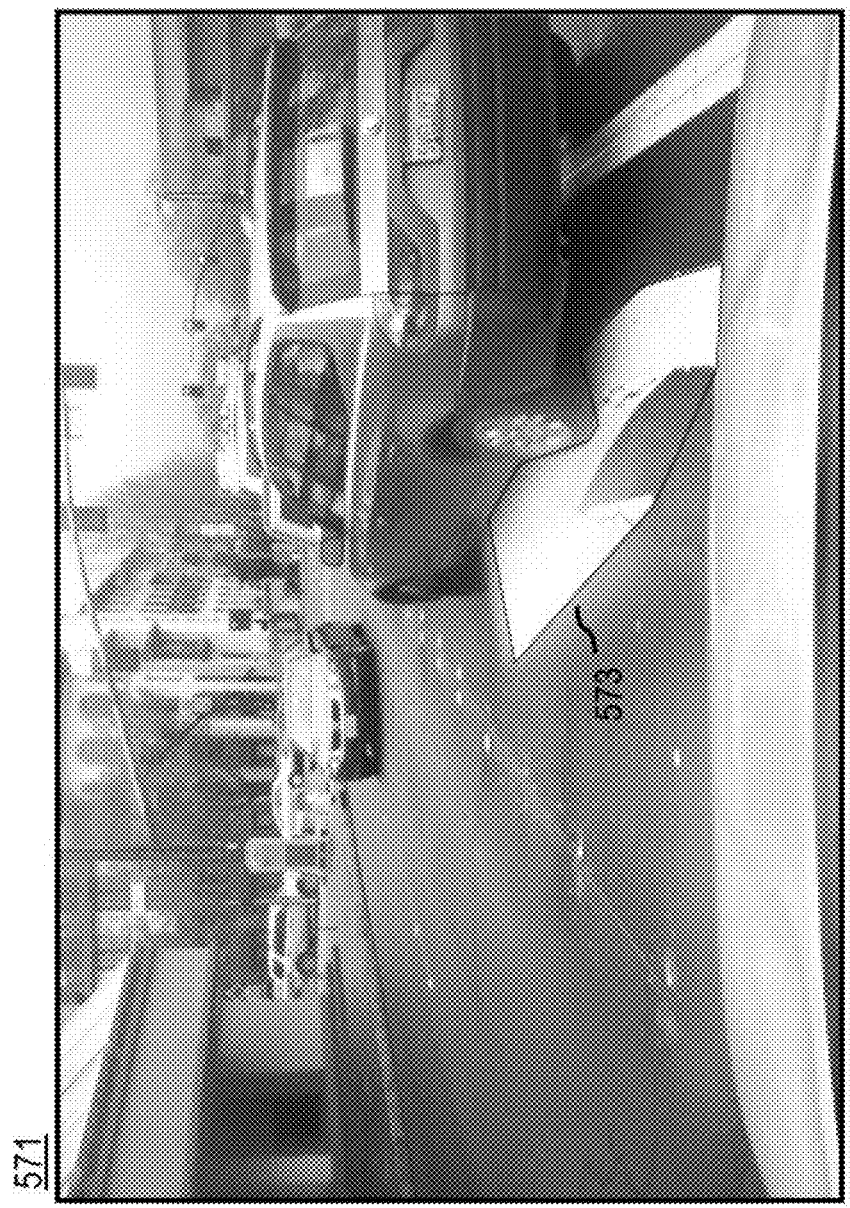
Figure 5I:
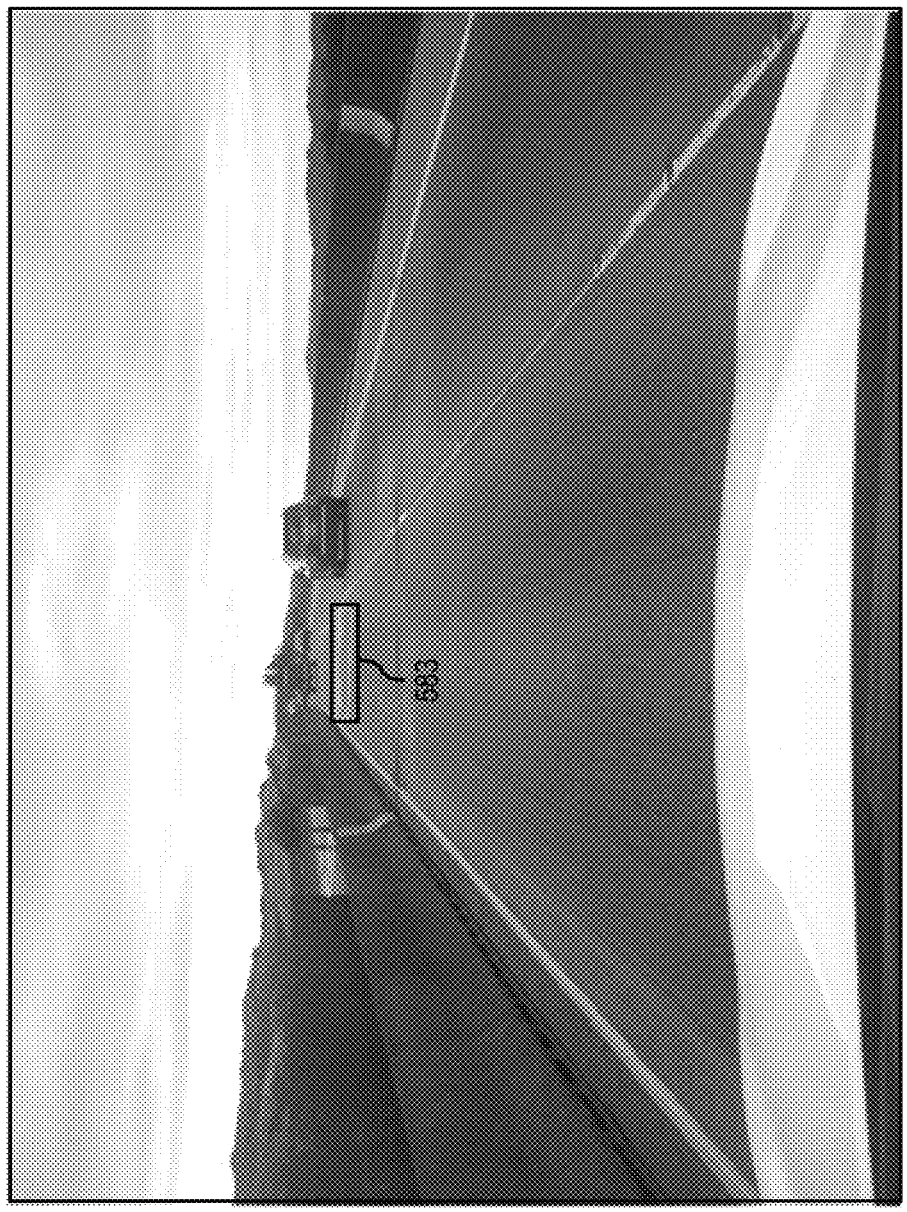
Figure 5J:
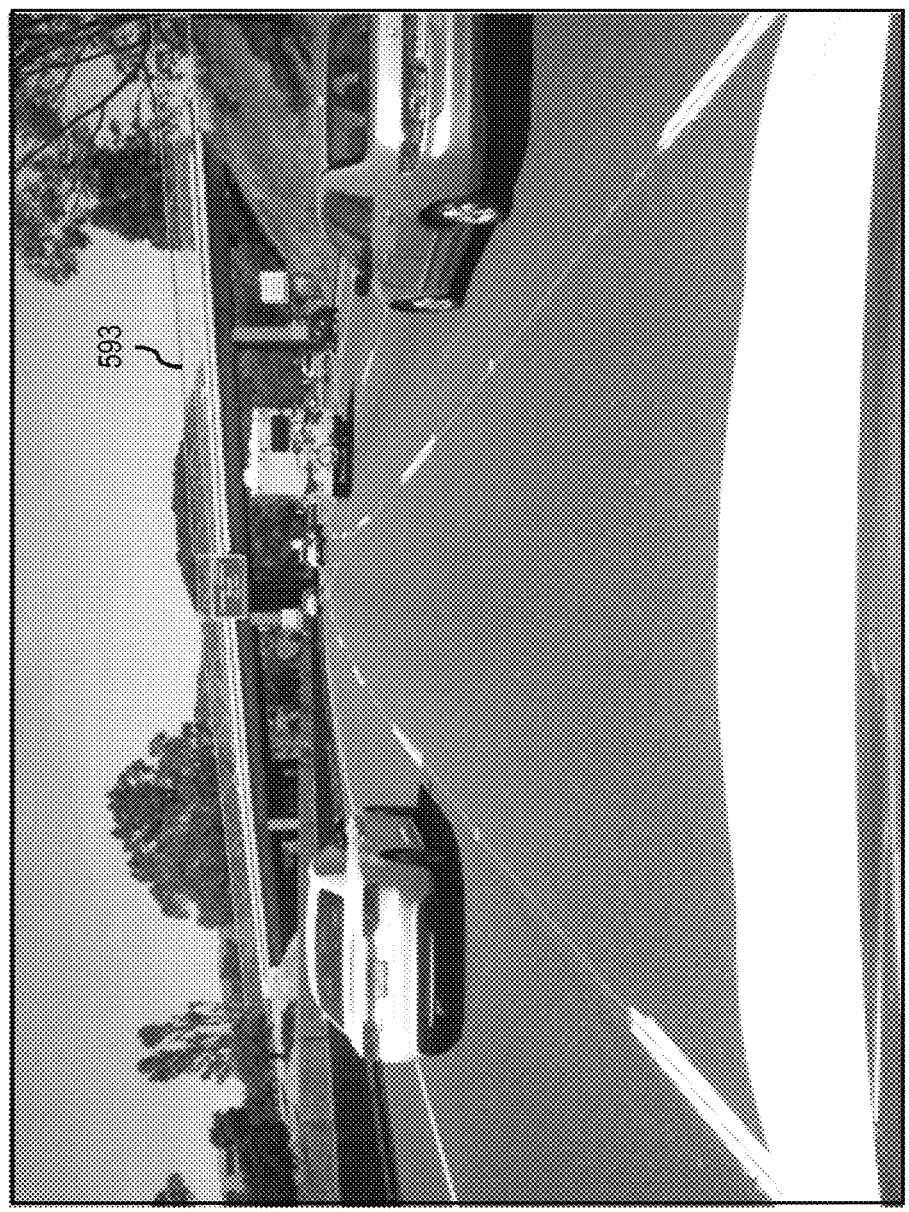

The image 531 of FIG. 5D and the image 541 of FIG. 5E are examples of blurred images (e.g., caused by a dirty camera lens) where it is difficult to accurately observe and label the road boundaries and road surface markings to label the ground truth. The image 551 of FIG. 5F shows an example of faded features 553 that many be difficult or challenging to label accurately. The image 561 of FIG. 5G shows a situation where the light on the surface of the road and the road texture make it challenging or difficult to label accurately. The image 571 of FIG. 5H shows an example of an occluded feature 573 whose complete shape would be difficult to label accurately. The image 581 of FIG. 5I depicts a feature 583 that is too distant and the resulting perspective distortion makes it difficult to label accurately without extra time or effort. The image 591 of FIG. 5J depicts an example bridge 593 with quite a few poles or posts on the railing, which would make it challenging or time-consuming to label each individual repetitive feature. In the example of FIG. 5J, the extra time and efforted need to label the detail of the poles in the railing may result in a corresponding benefit for the end use case or application (e.g., vehicle localization), and therefore this type of repetitive feature can be labeled as a skip area.

In one embodiment, example images of the road conditions such as those shown in FIGS. 5A-5J can be used by the machine learning system 103 to train a machine learning model or classifier to identify potential skip areas in images.

Figure 6:
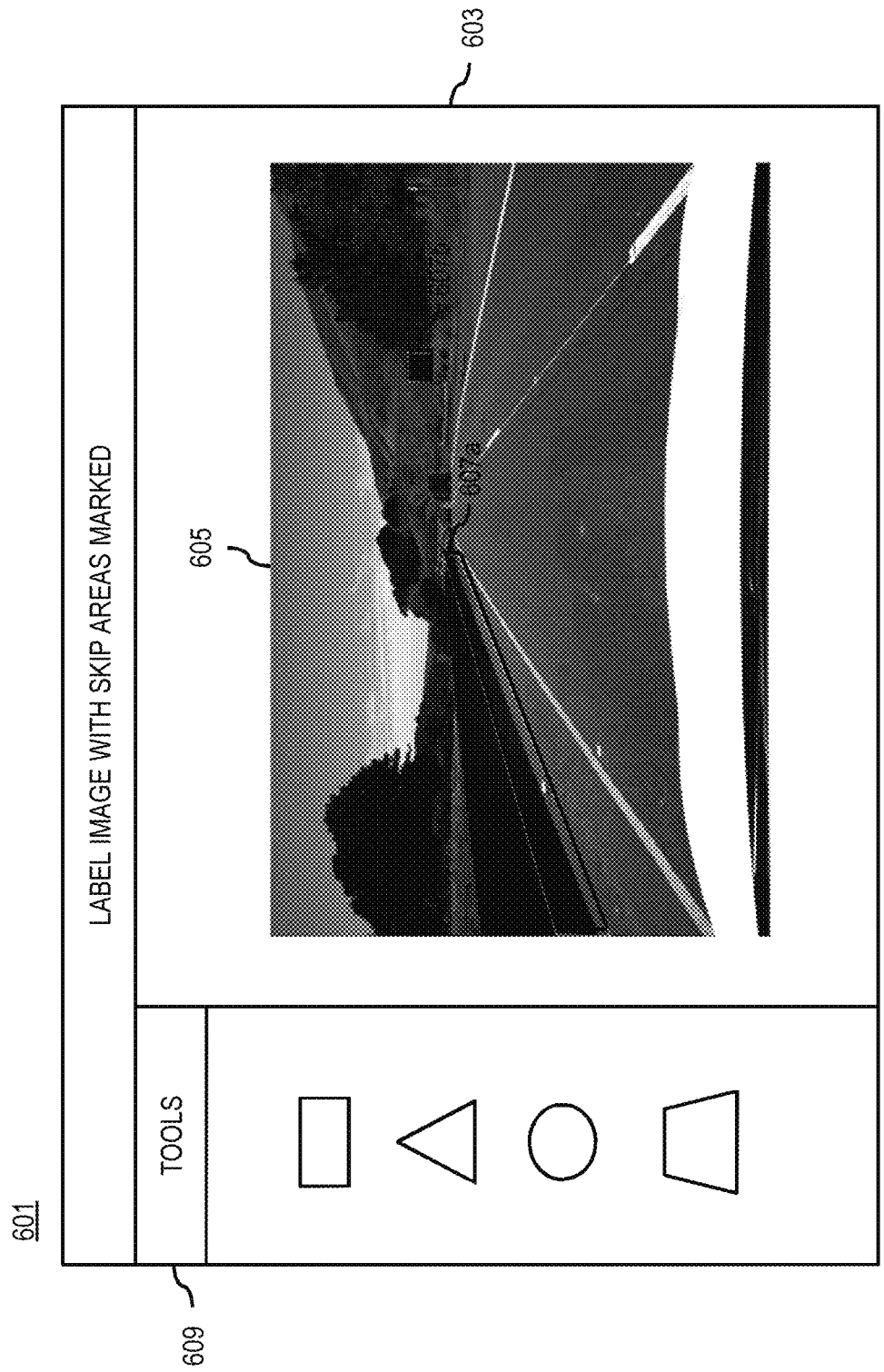
FIG. 6 is a diagram of a user interface for labeling an image with specified skip areas, according to one embodiment.

After specifying the skip areas of candidate training images, the labeling module 203 initiates a labeling of one or more features in the non-skip area of the image while excluding the one or more skip areas from the labeling to create a partially labeled image (step 303). As described above, the non-skip area is the portion of the image remaining after the specified skip areas have been removed. In one embodiment, the labeling module 203, presents a user interface depicting the image and a representation of the one or more skip areas, the non-skip area, or a combination thereof. The labeling of the one or more feature is performed via the user interface. FIG. 6 is an example labeling UI 601 that is similar to the UI 401 of FIG. 4A for specifying skip areas. For example, the UI 601 presents UI element 603 displaying an image 605 that is to be labeled. The image 605 is associated with previously defined skip areas 607a and 607b (also collectively referred to as skip areas 607. In this example, the skip areas 607 are visually represented in the UI 601 as outlined areas so that the portions of the image 605 falling in the skip areas 607 are still visible. However, it is contemplated that the labeling module 203 can use any other type of representation to delineate the skip areas 607 (e.g., filled boxes, shading, color, etc.). The UI 601 also presents a UI element 609 providing labeling tools to the user. In one embodiment, the labeling module highlights the non-skip area in the UI 601 instead or in addition to skip areas 607.

In one embodiment, the labeling module 203 can prevent, discard, or otherwise ignore any labels created for features identified in the skip areas 607. This results in creating a partially labeled image in which the human annotator creates feature labels for features in the non-skip area of the image 605 without creating any labels for skip areas 607. Because the annotator does not have to fully label the entire picture, the embodiments described herein for providing skip areas can advantageously decrease the labeling time for each image in which skip areas are defined. In one embodiment, the partially labeled image is then included in the training database 107 for training and/or evaluating a machine learning model.

In the embodiments described above, the skip areas are specified before labeling is performed. However, it is contemplated that the skip areas can be defined at any stage of the machine learning pipeline. For example, if the skip areas are defined after labeling but before training or evaluation of the machine learning model, the machine learning system 103 can discard or ignore any previously labeled features that fall within the subsequently specified skip areas. The machine learning system 103 can then proceed with training and evaluation of the machine learning model with the skip areas as described below.

In step 305, the training module 205 trains the machine learning model using the training dataset including images with specified skip areas. In one embodiment, during training, the training module 205 can ignore the specified skip areas and any feature labels that may be associated with the skip areas. In one embodiment, the training module 205 can incorporate a supervised learning model (e.g., a logistic regression model, RandomForest model, and/or any equivalent model) to train a machine learning model based on the training data including the partially labeled images with skip areas representing the ground truth data. For example, during training, the training module 205 uses a learner module that feeds feature sets from the portion of the training dataset marked for training into the feature prediction model to compute a predicted feature set using an initial set of model parameters.

The learner module then compares the predicted feature set to the ground truth data (e.g., the manually marked feature labels) in the training data set for each image used for training. For example, the learner module computes a loss function representing, for instance, an accuracy of the predictions for the initial set of model parameters. In one embodiment, the training module 205 computes a loss function for the training of the machine learning module based on the non-skip area of the image while excluding the one or more skip areas from the loss function to create a trained machine learning model. In this way, the training module 205 can improve the training by focusing on only the non-skip areas have that high-quality feature labels as opposed to including feature labels from the skip areas that may have lower quality feature labels because they are more challenging or difficult for the labeler. The learner module of the training module 205 then incrementally adjusts the model parameters until the model minimizes the loss function (e.g., achieves a maximum accuracy with respect to the manually marked labels in the non-skip areas of training data). In other words, a "trained" feature prediction model is a classifier with model parameters adjusted to make accurate predictions with respect to the non-skip image areas of the training dataset or ground truth data.

In step 307, the evaluation module 207 processes an evaluation portion of the training dataset to determine one or more feature predictions. The evaluation portion, for instance, the part of the training data set that was not used during training and has been reserved for validating or evaluating the performance of the trained machine learning model. The evaluation or validation portion will include ground truth feature labels for the corresponding images in the evaluation dataset. These validation images can be processed using the trained feature model to make determine predicted features. The evaluation module 207 then compares the predicted feature set against the manually labeled feature set (e.g., the ground truth data) for each image. However, in the case of skip areas, the images in the evaluation data set would not have ground truth labels or labels with a desired accuracy level against which the evaluation module 207 can compare feature labels. This is because, in one embodiment, the trained machine learning model can process all pixels in the evaluation images, which can result in making feature predictions in the skip areas of the evaluation. These predicted features generated for the skip areas would appear as false positives when compared against the ground truth data because the ground truth data would not be labeled in the skip areas. The potentially erroneous false positives can lead to an inaccurate evaluation of the trained machine learning model's true performance. Accordingly, to improve model evaluation, the evaluation module 207 excludes the one or more feature predictions associated with the one or more skip areas from an evaluation of the trained machine learning model. In one embodiment, the excluding of the one or more feature predictions from the evaluation of the trained machine learning model comprises not flagging the one or more feature predictions as a false positive when the one or more feature predictions are associated with the one or more skip areas.

Returning to FIG. 1, as shown, the system 100 includes the machine learning system 103 for providing skip areas to label, train, and/or evaluate a feature prediction model according the various embodiments described herein. In some use cases, the system 100 can include the computer vision system 105 configured to use machine learning to detect objects or features depicted in images. For example, with respect to autonomous, navigation, mapping, and/or other similar applications, the computer vision system 105 can detect road features (e.g., lane lines, signs, etc.) in an input image and generate associated prediction confidence values, according to the various embodiments described herein. In one embodiment, the machine learning system 103 includes a neural network or other machine learning system to make predictions from machine learning models. For example, when the input to the machine learning model are images used for visual odometry, the features of interest can include lane lines detected in the images to support localization of, e.g., a vehicle 101 within the sensed environment. In one embodiment, the neural network of the machine learning system 103 is a traditional convolutional neural network which consists of multiple layers of collections of one or more neurons (which are configured to process a portion of an input image. In one embodiment, the receptive fields of these collections of neurons (e.g., a receptive layer) can be configured to correspond to the area of an input image delineated by a respective a grid cell generated as described above.

In one embodiment, the machine learning system 103 and/or the computer vision system 105 also have connectivity or access to a geographic database 113 which stores representations of mapped geographic features to facilitate visual odometry to increase localization accuracy. In one embodiment, the machine learning system 103 and/or computer vision system 105 have connectivity over a communication network 115 to the services platform 109 that provides one or more services 111. By way of example, the services 111 may be third party services and include mapping services, navigation services, travel planning services, notification services, social networking services, content (e.g., audio, video, images, etc.) provisioning services, application services, storage services, contextual information determination services, location based services, information based services (e.g., weather, news, etc.), etc. In one embodiment, the services 111 uses the output of the machine learning system 103 and/or of the computer vision system 105 employing skip areas for machine learning (e.g., detected lane features) to localize the vehicle 101 or a user equipment 117 (e.g., a portable navigation device, smartphone, portable computer, tablet, etc.) to provide services 111 such as navigation, mapping, other location-based services, etc.

In one embodiment, the machine learning system 103 and/or computer vision system 105 may be a platform with multiple interconnected components. The machine learning system 103 and/or computer vision system 105 may include multiple servers, intelligent networking devices, computing devices, components and corresponding software for providing parametric representations of lane lines. In addition, it is noted that the machine learning system 103 and/or computer vision system 105 may be a separate entity of the system 100, a part of the one or more services 111, a part of the services platform 109, or included within the UE 117 and/or vehicle 101.

In one embodiment, content providers 119a-119m (collectively referred to as content providers 119) may provide content or data (e.g., including geographic data, parametric representations of mapped features, etc.) to the geographic database 113, the machine learning system 103, the computer vision system 105, the services platform 109, the services 111, the UE 117, the vehicle 101, and/or an application 121 executing on the UE 117. The content provided may be any type of content, such as map content, textual content, audio content, video content, image content, etc. In one embodiment, the content providers 119 may provide content that may aid in the detecting and classifying of lane lines and/or other features in image data, and estimating the quality of the detected features. In one embodiment, the content providers 119 may also store content associated with the geographic database 113, machine learning system 103, computer vision system 105, services platform 109, services 111, UE 117, and/or vehicle 101. In another embodiment, the content providers 119 may manage access to a central repository of data, and offer a consistent, standard interface to data, such as a repository of the geographic database 113.

In one embodiment, the UE 117 and/or vehicle 101 may execute a software application 121 to image data for specifying skip areas, and generating training observations for machine learning models according the embodiments described herein. By way of example, the application 121 may also be any type of application that is executable on the UE 117 and/or vehicle 101, such as autonomous driving applications, mapping applications, location-based service applications, navigation applications, content provisioning services, camera/imaging application, media player applications, social networking applications, calendar applications, and the like. In one embodiment, the application 121 may act as a client for the machine learning system 103 and/or computer vision system 105 and perform one or more functions associated with providing skip areas for machine learning models alone or in combination with the machine learning system 103.

By way of example, the UE 117 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 117 can support any type of interface to the user (such as "wearable" circuitry, etc.). In one embodiment, the UE 117 may be associated with the vehicle 101 or be a component part of the vehicle 101.

In one embodiment, the UE 117 and/or vehicle 101 are configured with various sensors for generating or collecting environmental image data (e.g., for processing by the machine learning system 103 and/or computer vision system 105), related geographic data, etc. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 117 and/or vehicle 101 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 117 and/or vehicle 101 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 117 and/or vehicle 101 may include GPS or other satellite-based receivers to obtain geographic coordinates from satellites 123 for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 115 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the machine learning system 103, computer vision system 105, services platform 109, services 111, UE 117, vehicle 101, and/or content providers 119 communicate with each other and other components of the system 100 using well known, new or still developing protocols. In this context, a protocol includes a set of rules defining how the network nodes within the communication network 115 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 7:
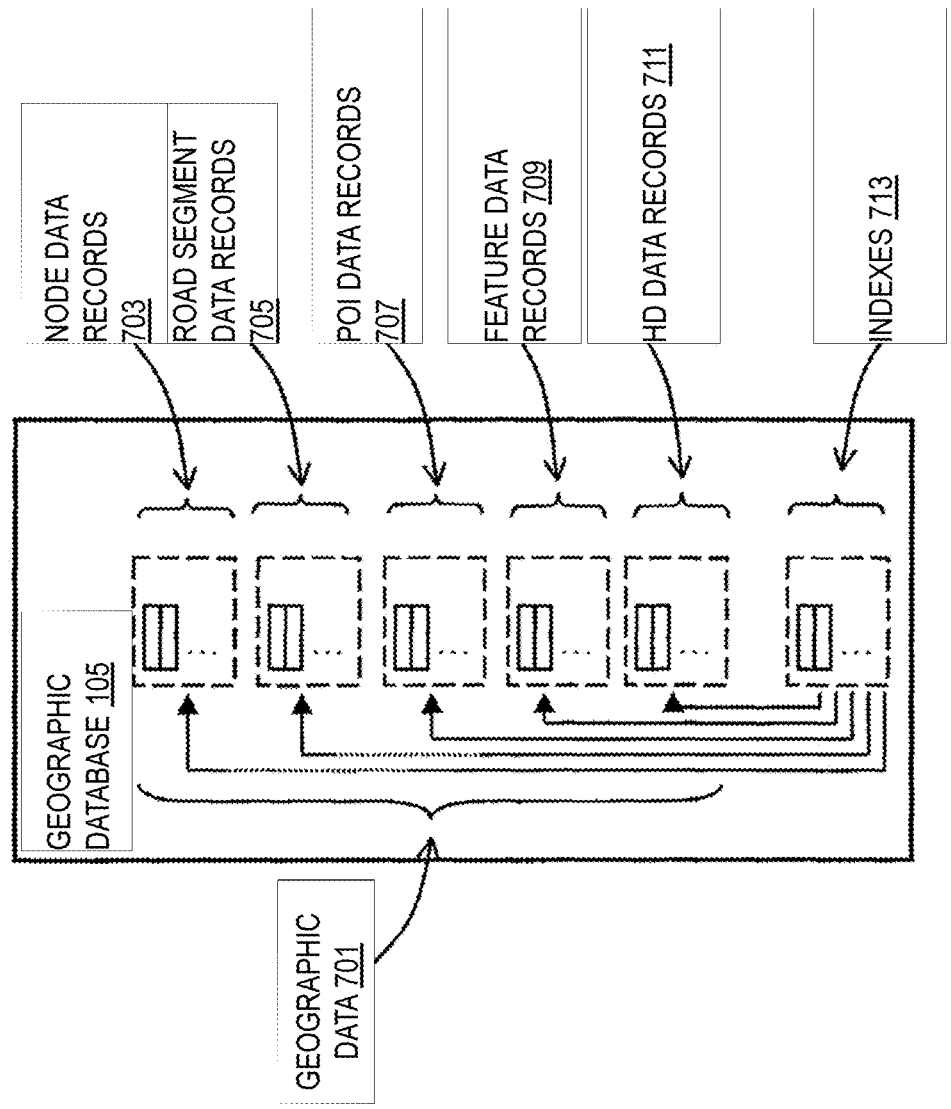
FIG. 7 is a diagram of a geographic database, according to one embodiment.

FIG. 7 is a diagram of a geographic database, according to one embodiment. In one embodiment, the geographic database 113 includes geographic data 701 used for (or configured to be compiled to be used for) mapping and/or navigation-related services, such as for video odometry based on the mapped features (e.g., lane lines, road markings, signs, etc.). In one embodiment, the geographic database 113 includes high resolution or high definition (HD) mapping data that provide centimeter-level or better accuracy of map features. For example, the geographic database 113 can be based on Light Detection and Ranging (LiDAR) or equivalent technology to collect billions of 3D points and model road surfaces and other map features down to the number lanes and their widths. In one embodiment, the HD mapping data (e.g., HD data records 711) capture and store details such as the slope and curvature of the road, lane markings, roadside objects such as sign posts, including what the signage denotes. By way of example, the HD mapping data enable highly automated vehicles to precisely localize themselves on the road.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 113.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 113 follows certain conventions. For example, links do not cross themselves and do not cross each other except at a node. Also, there are no duplicated shape points, nodes, or links. Two links that connect each other have a common node. In the geographic database 113, overlapping geographic features are represented by overlapping polygons. When polygons overlap, the boundary of one polygon crosses the boundary of the other polygon. In the geographic database 113, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 113 includes node data records 703, road segment or link data records 705, POI data records 707, machine learning data records 709, HD mapping data records 711, and indexes 713, for example. More, fewer or different data records can be provided. In one embodiment, additional data records (not shown) can include cartographic ("carto") data records, routing data, and maneuver data. In one embodiment, the indexes 713 may improve the speed of data retrieval operations in the geographic database 113. In one embodiment, the indexes 713 may be used to quickly locate data without having to search every row in the geographic database 113 every time it is accessed. For example, in one embodiment, the indexes 713 can be a spatial index of the polygon points associated with stored feature polygons.

In exemplary embodiments, the road segment data records 705 are links or segments representing roads, streets, or paths, as can be used in the calculated route or recorded route information for determination of one or more personalized routes. The node data records 703 are end points corresponding to the respective links or segments of the road segment data records 705. The road link data records 705 and the node data records 703 represent a road network, such as used by vehicles, cars, and/or other entities. Alternatively, the geographic database 113 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 113 can include data about the POIs and their respective locations in the POI data records 707. The geographic database 113 can also include data about places, such as cities, towns, or other communities, and other geographic features, such as bodies of water, mountain ranges, etc. Such place or feature data can be part of the POI data records 707 or can be associated with POIs or POI data records 707 (such as a data point used for displaying or representing a position of a city).

In one embodiment, the geographic database 113 can also include machine learning data records 709 for storing the image skip areas and related data used according to the various embodiments described herein. Alternatively, the image skip areas can be stored as metadata in the training database 107 in association the respective images of a machine learning training dataset. In addition, the machine learning data records 709 can also store training data, machine learning models, annotated observations, computed featured distributions, sampling probabilities, and/or any other data generated or used by the system 100 according to the various embodiments described herein. By way of example, the machine learning data records 709 can be associated with one or more of the node records 703, road segment records 705, and/or POI data records 707 to support localization or visual odometry based on the features stored therein and the corresponding estimated quality of the features. In this way, the records 709 can also be associated with or used to classify the characteristics or metadata of the corresponding records 703, 705, and/or 707.

In one embodiment, as discussed above, the HD mapping data records 711 model road surfaces and other map features to centimeter-level or better accuracy. The HD mapping data records 711 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 711 are divided into spatial partitions of varying sizes to provide HD mapping data to vehicles 101 and other end user devices with near real-time speed without overloading the available resources of the vehicles 101 and/or devices (e.g., computational, memory, bandwidth, etc. resources).

In one embodiment, the HD mapping data records 711 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 711.

In one embodiment, the HD mapping data records 711 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 113 can be maintained by the content provider 119 in association with the services platform 109 (e.g., a map developer). The map developer can collect geographic data to generate and enhance the geographic database 113. There can be different ways used by the map developer to collect data. These ways can include obtaining data from other sources, such as municipalities or respective geographic authorities. In addition, the map developer can employ field personnel to travel by vehicle (e.g., vehicle 101 and/or UE 117) along roads throughout the geographic region to observe features and/or record information about them, for example. Also, remote sensing, such as aerial or satellite photography, can be used.

The geographic database 113 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101 or UE 117, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for providing skip areas for machine learning may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
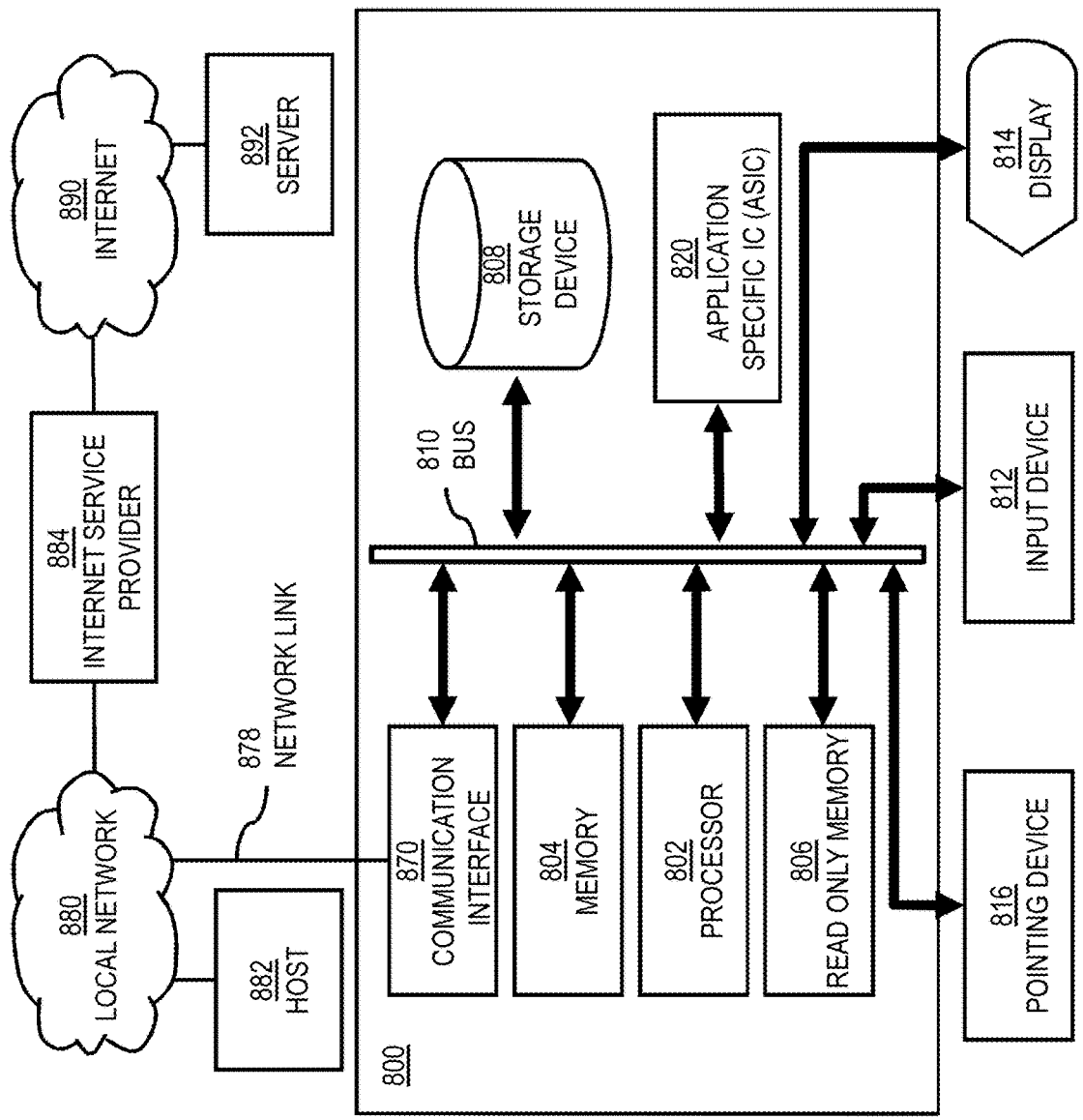
FIG. 8 is a diagram of hardware that can be used to implement an embodiment of the invention.

FIG. 8 illustrates a computer system 800 upon which an embodiment of the invention may be implemented. Computer system 800 is programmed (e.g., via computer program code or instructions) to provide skip areas for machine learning as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information as specified by computer program code related to providing skip areas for machine learning. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing skip areas for machine learning. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing skip areas for machine learning, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general, the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 115 for providing skip areas for machine learning.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide skip areas for machine learning as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively, or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide skip areas for machine learning. The memory 905 also stores the data associated with or generated by the execution of the inventive steps.

Figure 10:
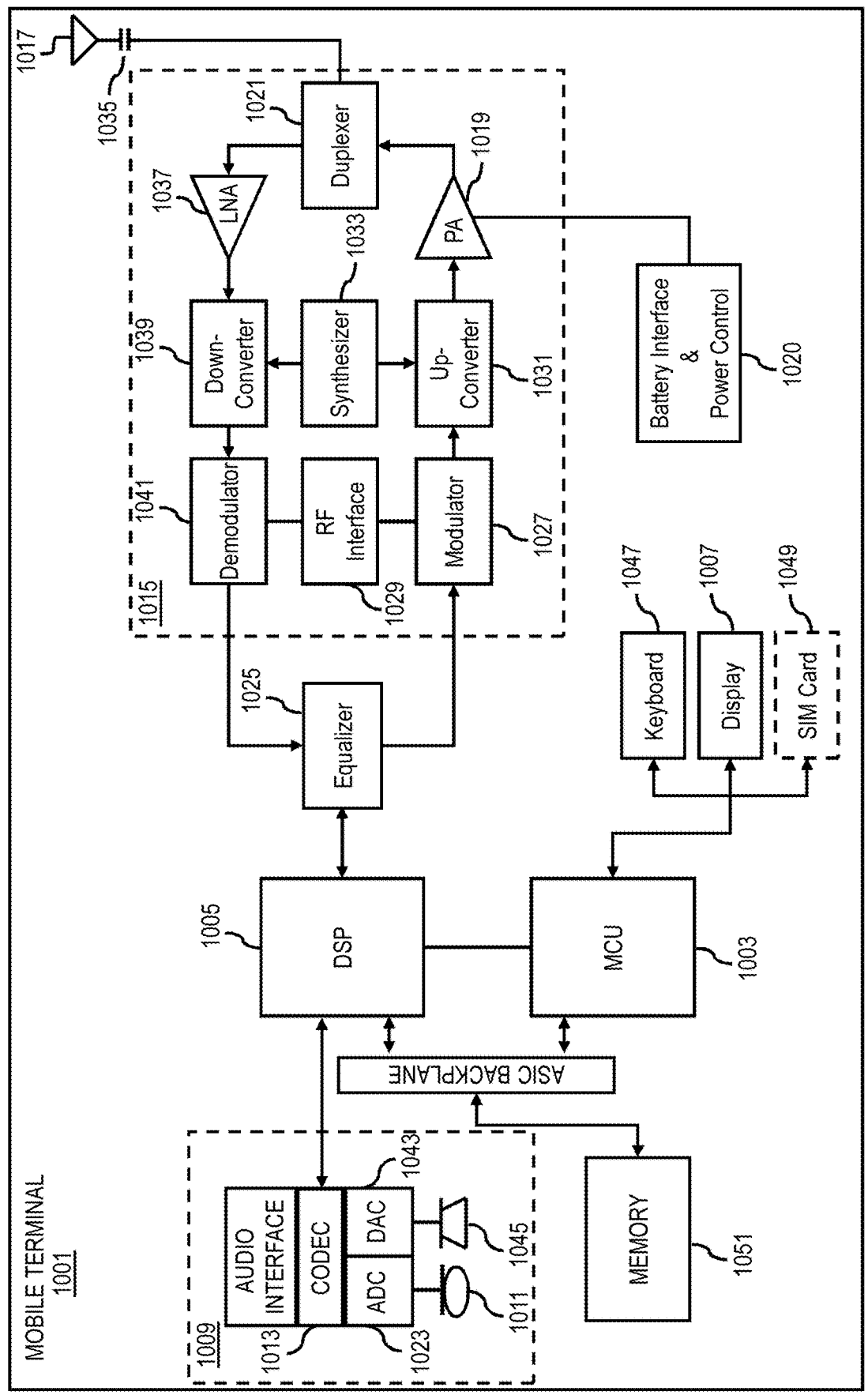
FIG. 10 is a diagram of a mobile terminal (e.g., handset) that can be used to implement an embodiment of the invention.

FIG. 10 is a diagram of exemplary components of a mobile station (e.g., handset) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions that offer automatic contact matching. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001 to provide skip areas for machine learning. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1051 may be, but not limited to, a single memory, CD, DVD, ROM, RAM, EEPROM, optical storage, or any other non-volatile or non-transitory storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method for using one or more skip areas to label, train, and/or evaluate a machine learning model comprising:
    specifying the one or more skip areas with respect to an image, wherein a non-skip area of the image is a portion of the image that is not in the one or more skip areas;
    initiating, by a processor, a labeling of one or more features in the non-skip area of the image while excluding the one or more skip areas from the labeling to create a partially labeled image, wherein the partially labeled image is included in a training dataset for training a machine learning model;
    processing an evaluation portion of the training dataset to determine one or more feature predictions; and
    excluding the one or more feature predictions associated with the one or more skip areas from an evaluation of a trained machine learning model.

2. The method of claim 1, wherein the one or more image conditions include an over-exposed area, an under-exposed area, a foggy area, a blurred area, a faded feature, a shiny surface, an occluded area, a perspective distortion, a repetitive feature, or a combination thereof.

3. The method of claim 1, further comprising:
    presenting a user interface depicting the image and a representation of the one or more skip areas, the non-skip area, or a combination thereof,
    wherein the labeling of the one or more features is performed via the user interface.

4. The method of claim 1, wherein the excluding of the one or more feature predictions from the evaluation of the trained machine learning model comprises not flagging the one or more feature predictions as a false positive when the one or more feature predictions are associated with the one or more skip areas.

5. The method of claim 1, wherein the one or more skip areas are delineated in the image using one or more polygons.

6. The method of claim 1, further comprising:
    processing the image to determine one or more image conditions, wherein the one or more skip areas correspond to one or more image areas corresponding to the one or more image conditions.

7. A computer-implemented method for using one or more skip areas to label, train, and/or evaluate a machine learning model comprising:

specifying the one or more skip areas with respect to an image, wherein a non-skip area of the image is a portion of the image that is not in the one or more skip areas;

initiating, by a processor, a labeling of one or more features in the non-skip area of the image while excluding the one or more skip areas from the labeling to create a partially labeled image, wherein the partially labeled image is included in a training dataset for training a machine learning model; and computing a loss function for the training of the machine learning module based on the non-skip area of the image while excluding the one or more skip areas from the loss function to create a trained machine learning model.

8. An apparatus for using one or more skip areas to label, train, and/or evaluate a machine learning model comprising:

at least one processor; and at least one memory including computer program code for one or more programs, the at least one memory and the computer program code configured to, with the at least one processor, cause the apparatus to perform at least the following, specify the one or more skip areas with respect to an image, wherein a non-skip area of the image is a portion of the image that is not in the one or more skip areas;

initiate a labeling of one or more features in the non-skip area of the image while excluding the one or more skip areas from the labeling to create a partially labeled image, wherein the partially labeled image is included in a training dataset for training a machine learning model; and compute a loss function for the training of the machine learning module based on the non-skip area of the image while excluding the one or more skip areas from the loss function to create a trained machine learning model.

9. An apparatus for using one or more skip areas to label, train, and/or evaluate a machine learning model comprising:

at least one processor; and at least one memory including computer program code for one or more programs, the at least one memory and the computer program code configured to, with the at least one processor, cause the apparatus to perform at least the following, specify the one or more skip areas with respect to an image, wherein a non-skip area of the image is a portion of the image that is not in the one or more skip areas;

initiate a labeling of one or more features in the non-skip area of the image while excluding the one or more skip areas from the labeling to create a partially labeled image, wherein the partially labeled image is included in a training dataset for training a machine learning model;

process an evaluation portion of the training dataset to determine one or more feature predictions; and exclude the one or more feature predictions associated with the one or more skip areas from an evaluation of a trained machine learning model.

10. The apparatus of claim 9, wherein the one or more image conditions include an over-exposed area, an under-exposed area, a foggy area, a blurred area, a faded feature, a shiny surface, an occluded area, a perspective distortion, a repetitive feature, or a combination thereof.

11. The apparatus of claim 9, wherein the apparatus is further caused to:

present a user interface depicting the image and a representation of the one or more skip areas, the non-skip area, or a combination thereof, wherein the labeling of the one or more features is performed via the user interface.

12. The apparatus of claim 9, wherein the excluding of the one or more feature predictions from the evaluation of the trained machine learning model comprises not flagging the one or more feature predictions as a false positive when the one or more feature predictions are associated with the one or more skip areas.

13. The apparatus of claim 9, wherein the apparatus is further caused to:

process the image to determine one or more image conditions, wherein the one or more skip areas correspond to one or more image areas corresponding to the one or more image conditions.

14. A non-transitory computer-readable storage medium for using one or more skip areas to label, train, and/or evaluate a machine learning model, carrying one or more sequences of one or more instructions which, when executed by one or more processors, cause an apparatus to perform:

specifying the one or more skip areas with respect to an image, wherein a non-skip area of the image is a portion of the image that is not in the one or more skip areas;

initiating, by a processor, a labeling of one or more features in the non-skip area of the image while excluding the one or more skip areas from the labeling to create a partially labeled image, wherein the partially labeled image is included in a training dataset for training a machine learning model;

processing an evaluation portion of the training dataset to determine one or more feature predictions; and excluding the one or more feature predictions associated with the one or more skip areas from an evaluation of the trained machine learning model.

15. The non-transitory computer-readable storage medium of claim 14, wherein the apparatus is caused to further perform:

processing the image to determine one or more image conditions, wherein the one or more skip areas correspond to one or more image areas corresponding to the one or more image conditions.

16. The non-transitory computer-readable storage medium of claim 14, wherein the one or more image conditions include an over-exposed area, an under-exposed area, a foggy area, a blurred area, a faded feature, a shiny surface, an occluded area, a perspective distortion, a repetitive feature, or a combination thereof.

17. The non-transitory computer-readable storage medium of claim 14, wherein the apparatus is caused to further perform:

computing a loss function for the training of the machine learning module based on the non-skip area of the image while excluding the one or more skip areas from the loss function to create a trained machine learning model.

18. The non-transitory computer-readable storage medium of claim 14, wherein the one or more skip areas are delineated in the image using one or more polygons.

19. The non-transitory computer-readable storage medium of claim 14, wherein the excluding of the one or more feature predictions from the evaluation of the trained machine learning model comprises not flagging the one or more feature predictions as a false positive when the one or more feature predictions are associated with the one or more skip areas.

20. The non-transitory computer-readable storage medium of claim 14, wherein the apparatus is caused to further perform:
- presenting a user interface depicting the image and a representation of the one or more skip areas, the non-skip area, or a combination thereof,
- wherein the labeling of the one or more features is performed via the user interface.

* * * * *